United States Patent [19]
Becker et al.

[11] Patent Number: 5,513,832
[45] Date of Patent: May 7, 1996

[54] VARIABLE FORCE SOLENOID VALVE

[75] Inventors: David L. Becker, Oak Park; John W. Curnow, Utica; Donald J. West, Warren; Craig A. Carlson, Harper Woods, all of Mich.

[73] Assignee: Lectron Products, Inc., Rochester Hills, Mich.

[21] Appl. No.: 241,721

[22] Filed: Apr. 22, 1994

[51] Int. Cl.⁶ .................................................. F16K 31/06
[52] U.S. Cl. ........................ 251/129.18; 251/129.15; 137/82; 335/274; 335/281
[58] Field of Search ............... 251/129.01, 129.08, 251/129.15, 129.18; 137/82; 335/274, 281, 260

[56] References Cited

U.S. PATENT DOCUMENTS

| | | |
|---|---|---|
| 1,278,254 | 9/1918 | Taylor . |
| 1,958,019 | 5/1934 | Reasoner . |
| 2,535,444 | 12/1959 | Miller . |
| 4,277,094 | 7/1981 | Roue . |
| 4,458,930 | 7/1984 | Goike et al. . |
| 4,522,371 | 6/1985 | Fox et al. . |
| 4,534,375 | 8/1985 | Fox . |
| 4,535,816 | 8/1985 | Feder et al. .......................... 335/274 X |
| 4,540,154 | 9/1985 | Kolchinsky et al. . |
| 4,635,683 | 1/1987 | Nielsen ........................ 251/129.15 X |
| 4,715,396 | 12/1987 | Fox . |
| 4,811,984 | 3/1989 | Hempel . |
| 4,917,418 | 4/1990 | Gokee . |
| 4,947,893 | 8/1990 | Miller et al. . |
| 4,951,637 | 8/1990 | Cook . |
| 4,971,370 | 11/1990 | Detweiler et al. . |
| 4,988,074 | 1/1991 | Najmolhoda .................. 251/129.15 X |
| 4,995,369 | 2/1991 | Cook . |
| 5,045,455 | 10/1991 | Cook . |
| 5,050,568 | 9/1991 | Cook . |
| 5,069,188 | 12/1991 | Cook . |
| 5,083,546 | 1/1992 | Detweiler et al. . |
| 5,113,837 | 5/1992 | Faull . |
| 5,115,785 | 5/1992 | Cook . |
| 5,183,022 | 2/1993 | Cook . |
| 5,240,227 | 8/1993 | Sich .............................. 251/129.15 X |

Primary Examiner—Kevin Lee
Attorney, Agent, or Firm—Harness, Dickey & Pierce

[57] ABSTRACT

A combined bearing/diaphragm seal for use in a solenoid valve assembly or the like is disclosed which provides a flexible fluid seal between the solenoid sub-assembly and the valve sub-assembly. The solenoid and valve sub-assemblies communicate mechanically via a portion of a solenoid armature which translates through the combined bearing/diaphragm seal and controls elements of the valve sub-assembly for regulating outlet fluid pressure. The bearing portion of the combined bearing/diaphragm seal comprises a flat spring-plate that is adapted to resiliently deflect in response to movement of the solenoid armature. The diaphragm portion of the combined bearing/diaphragm seal is an elastomeric seal material applied to at least one side of the spring plate.

17 Claims, 2 Drawing Sheets

VARIABLE FORCE SOLENOID VALVE

BACKGROUND OF THE INVENTION

This invention relates generally to electrically-modulated fluid control devices and, more particularly, to a variable force solenoid·valve assembly equipped with a combined flat spring/diaphragm which isolates the valve sub-assembly from the solenoid sub-assembly for preventing fluid-borne particles from contaminating the magnetic solenoid components.

As is known, solenoid-operated fluid control devices are used in a wide range of electrically controlled systems for controlling the pressure and/or flow rate of fluid discharged from a valve assembly in response to an electrical input signal supplied to a solenoid assembly. In many applications, a valve sub-assembly and a solenoid sub-assembly are integrated into a unitized fluid control device, commonly referred to as a solenoid valve assembly.

In a typical solenoid valve assembly, the solenoid sub-assembly has an armature which acts on, or is coupled to, a valve member in the valve sub-assembly. As is known, movement of the armature is responsive to the magnetic flux generated as a result of the electrical current applied to the electromagnetic windings of the solenoid sub-assembly. Thus, translational movement of the armature causes corresponding translational movement of the valve member for controlling the magnitude of the output pressure of fluid discharged from the valve sub-assembly. More particularly, fluid at an inlet pressure is delivered to an inlet port of the valve sub-assembly such that the position of the valve member regulates an output pressure generated at an output port of the valve sub-assembly as a function of the energized state of the solenoid assembly. Depending upon the particular design of the solenoid assembly, a change in energization level may cause a proportional increase or decrease in the output pressure, one such proportional device is commonly referred to as a "variable force" solenoid valve assembly or "VFS". One example of a conventional variable force solenoid valve assembly is disclosed in commonly owned U.S. Pat. No. 4,947,893 wherein the axially movable armature of the solenoid sub-assembly is coupled to a spool valve that is supported for axial sliding movement within the valve sub-assembly. As is also disclosed in the above-referenced patent, it is common to provide a guide bearing between the armature and spool valve to support and guide the concurrent translational movement thereof.

As in most hydraulic systems, the hydraulic fluid flowing through the valve sub-assembly is typically entrained with ferro-magnetic particles or shavings. Thus, fluid communication between the valve sub-assembly and the solenoid sub-assembly commonly results in the migration of these fluid-borne magnetic particles into the air gaps established between the armature and coil windings and/or other flux conducting components. Since some of the air gaps in solenoid sub-assemblies are calibrated after assembly to ensure precise accuracy, any subsequent contamination by magnetic particles can adversely affect the desired regulation characteristics of the output fluid pressure. In particular, when such contamination occurs, the reluctance of the magnetic flux path controlling movement of the armature may vary significantly, thereby resulting in inaccurate correlations between the applied energization current and the expected output pressure. In many applications, it is desirable to fluidically isolate or "seal" the solenoid sub-assembly from the valve sub-assembly, to inhibit such contaminant migration. However, achieving isolation between the valve sub-assembly and the solenoid sub-assembly presents a number of significant design challenges.

In an effort to inhibit such particle migration, some solenoid valve assemblies attempt to isolate the electromagnetic components of the solenoid sub-assembly from the valving components of the valve sub-assembly by installing a flexible elastomeric diaphragm between the armature and the valve member for establishing a fluid-tight barrier. However, use of a flexible elastomeric diaphragm still necessitates the use of a separate guide bearing for guiding the axial translatory movement of the armature. Accordingly, there is a recognized need to develop a fluid-tight barrier or seal that effectively isolates the magnetic and fluid control components of the solenoid valve assembly and yet which overcomes the design and installation constraints typically associated with conventional diaphragm and bearing arrangements.

SUMMARY OF THE INVENTION

The present invention discloses a solenoid valve assembly having means for isolating the valve sub-assembly from the solenoid sub-assembly for preventing the migration of fluid-borne contaminants into the electromagnetic flux circuit of the solenoid sub-assembly. In particular, a unique flexible bearing is installed between a movable valve member in the valve sub-assembly and a movable armature in the solenoid sub-assembly for supporting and guiding concurrent movement therebetween while concomitantly maintaining a fluid-tight barrier seal.

According to a preferred embodiment of the present invention, the solenoid valve assembly has a pin member that couples the armature to the valve member and which passes through the flexible bearing. The flexible bearing includes a disc-like spring plate laminated between one or more layers of an elastomeric material to form a combined bearing/diaphragm seal. The combined bearing/diaphragm seal is mounted along its outer peripheral edge between a valve body of the valve sub-assembly and a tubular body of the solenoid sub-assembly. The combined bearing/diaphragm seal includes a central aperture surrounding the outer surface of the pin member in a fluid-tight manner. Thus, a fluid seal is effectuated between the working components of the valve sub-assembly and electromagnetic components of the solenoid sub-assembly in the solenoid valve assembly. In operation, the spring plate resiliently deflects in response to axial movement of the armature and pin member so as to function as a flexible bearing while the laminated layers of elastomeric material inhibit fluid within the valve sub-assembly from communicating with the electromagnetic components in the solenoid sub-assembly. This isolation prevents magnetically conductive particles entrained in the fluid from contaminating the air gap(s) and altering the reluctance of the electromagnetic flux circuit established within the solenoid sub-assembly.

In accordance with a further preferred embodiment, an improved variable force solenoid valve is disclosed which is equipped with the combined bearing/diaphragm seal of the present invention. Use of the combined bearing/diaphragm seal is effective in maintaining the desired output pressure vs input current regulation characteristic over the entire service life of the variable force solenoid valve assembly.

According to yet another novel feature of the present invention, the valve sub-assembly is a bleed-type pressure control device having means for minimizing sensitivity to inlet pressure variations. In particular, the valve sub-assembly includes a spring-biased inlet compensator spool which is supported for axial movement within the valve body in response to inlet pressure variations. Such movement of the compensator spool results in a corresponding change in the amount of open area through the spool undercut, thereby establishing a "self-balanced" equilibrium state between the spring biasing exerted on the compensator spool and the inlet pressure.

From the subsequent detailed description taken in conjunction with the accompanying drawings and subjoined claims, other objects and advantages of the present invention will become apparent to those skilled in the art.

DETAILED DESCRIPTION OF THE INVENTION

Figure 1:
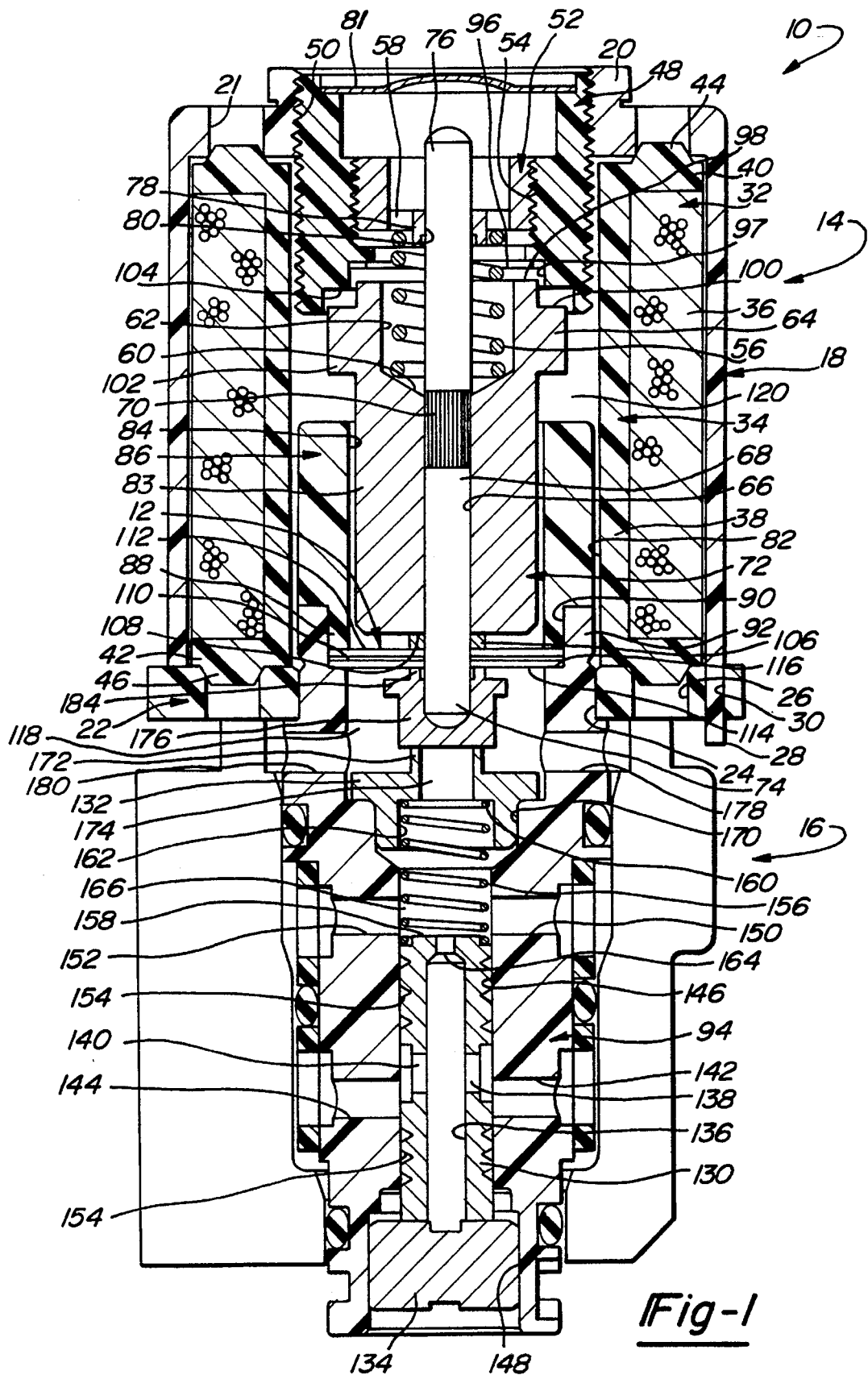
FIG. 1 is a cross-sectional view through a variable force solenoid valve assembly constructed in accordance with a preferred embodiment of the present invention.

A solenoid valve assembly in accordance with this invention is shown in cross-section in FIG. 1, and is generally designated by reference numeral 10. In general, solenoid valve assembly 10 is of a type used in a controller assembly for an automatic transmission, such as is disclosed in commonly owned U.S. Pat. No. 4,678,006, the disclosure of which is hereby incorporated by reference. In operation, solenoid valve assembly 10 receives an electrical current signal from a remote electronic controller unit (not shown) for controllably regulating the fluid pressure within various flow channels of the automatic transmission. Such pressure regulation permits finely tuned calibration of the rate of gear engagement or "shift feel", as described in greater detail in the above-referenced incorporated patent. Since the output fluid pressure is regulated in proportion to the magnitude of the electrical current signal, then solenoid valve assembly 10 is of the type generally referred to as a "variable force" solenoid valve assembly or "VFS".

As will be detailed, variable force solenoid valve assembly 10 is equipped with a unique combined bearing/diaphragm seal 12 for isolating the fluid controlling components from the electromagnetic solenoid components of variable force solenoid valve assembly 10. However, it should be noted at the outset that the specific construction of variable force solenoid valve assembly 10 is merely exemplary and that combined bearing/diaphragm seal 12 may be used in any number of hydraulic or pneumatic fluid control valves, such as pulse-width modulated solenoids and ON/OFF solenoid-operated valves, as well as in any other application in which such fluid isolation is desired. Therefore, variable force solenoid valve assembly 10 is merely representative of but one exemplary application for combined bearing/diaphragm seal 12 of the present invention. In a similar manner, variable force solenoid valve assembly 10 also includes a novel arrangement for minimizing sensitivity to inlet pressure fluctuations in a bleed-type pressure controlling device. While this arrangement will be detailed with greater specificity hereinafter, it is contemplated that the novel principles embodied therein can also be adapted for use in a plethora of electrically-modulated pressure control valves and the like.

FIG. 1 provides a detailed illustration of the internal working components of variable force solenoid valve assembly 10. Variable force solenoid valve assembly 10 has two major sub-assemblies consisting of solenoid sub-assembly 14 and valve sub-assembly 16. In the particular embodiment shown, solenoid sub-assembly 14 is enclosed by a cup-shaped tubular housing 18 having a generally closed end 20 with an annular groove 21 formed therein. A disc-like flux collector 22 having a central bore 24 and an annular groove 26 is fixed to the open end of housing 18. More particularly, flux collector 22 is fixed to housing 18 via a plurality of circumferentially spaced tabs 28 which extend through corresponding apertures 30 formed in flux collector 22, with tabs 28 being subsequently rolled during an assembly staking operation. Disposed within housing 18 is an electromagnetic coil assembly 32 comprised of a spool-shaped bobbin 34 on which an electrically-conductive coil 36 is wound. Bobbin 34 is made of an electrically non-conductive and non-magnetic material, such as nylon, and includes a central tubular segment 38 and a pair of radially extending end segments 40 and 42. In addition, raised annular projections 44 and 46 are respectively formed on end segments 40 and 42 and are shown seated with annular grooves 21 and 26 formed in closed end 20 of housing 18 and flux collector 22, respectively. In addition, the terminal ends of coil 36 are electrically connected to a pair of blade-type terminals (not shown). As is conventional, the blade-type terminals are adapted to be electrically connected to the remotely electronic controller unit via a suitable wiring harness (not shown).

At the end opposite to flux collector 22, an adjustment plug 48 threadably engages a threaded central bore 50 formed in closed end 20 of housing 18. In addition, the external threads of a spring adjustment screw 52 threadably engage a central threaded bore 54 formed in adjustment plug 48. A coil spring 56 is shown to have a first end in engagement with a transverse spring seat surface 58 of spring adjustment screw 52 and a second end in engagement with a tapered shoulder 60 of an enlarged chamber 62 formed in one end of an armature 64. Armature 64 also includes a smaller longitudinal bore 66 which communicates with enlarged chamber 62. An elongated pin 68 is rigidly retained within longitudinal bore 66 of armature 64 via splines 70 to define an armature assembly 72. Pin 68 has a first end 74 which extend out of armature 64 and is coupled to a valve member of valve sub-assembly 16, as will be described. A second end 76 of pin 68 extends out of enlarged chamber 62 and is journally supported for longitudinal movement with armature assembly 72 via a guide bearing 78 that is mounted centrally within transverse surface 58 of spring adjustment screw 52. As will be appreciated, guide bearing 78 has a central bore 80 that is sized to journally support and surround the exterior surface of second end 76 of pin 68 to guide axial movement thereof while inhibiting excessive radial deflection for positioning and maintaining armature assembly 72 for translational movement along the common longitudinal axis of coil assembly 32. In addition, guide bearing 78 is adapted to maintain a relatively uniform radial clearance or "air gap" between the corresponding radial edge surfaces of armature 64 and adjustment plug 48 during longitudinal movement of armature assembly 72 relative to adjustment plug 48. A welch cap 81 is provided to enclose end 20 of housing 18.

With continued reference to FIG. 1, armature assembly 72 is shown to be positioned within a longitudinal bore 82 formed in tubular segment 38 of bobbin 34. More particularly, an elongated cylindrical portion 83 of armature 64 is coaxially aligned and retained within a central bore 84 formed in a tubular body member 86 such that armature assembly 72 can move longitudinally with respect thereto. Combined bearing/diaphragm seal 12 is adapted to guide longitudinal movement of first end 74 of pin 68 for maintaining a relatively uniform radial air gap between cylindrical portion 83 of armature 64 and tubular body 86. Tubular body member 86 is made from a magnetically conductive material and forms part of the electromagnetic flux circuit of solenoid sub-assembly 14, as will be described. In addition, a stepped end portion 88 of tubular body member 86 is press-fit within a bore 90 formed by an annular extension 92 of a valve body 94 associated with valve sub-assembly 16. Finally, flux collector 22 is rigidly secured (i.e., press-fit) to valve body 94 such that central bore 24 of flux collector 22 surrounds and engages an outer portion of valve body adjacent to extension 92.

As noted, second end 76 of pin 68 is supported for translational movement via guide bearing 78 which is retained on spring adjustment screw 52. In addition, an armature stop ring 96 is press-fit into a recessed bore 97 formed in adjustment plug 48. Armature stop ring 96 is made of a magnetically non-conductive material and is sized and located to contact an end surface 98 of armature 64 so as to prevent radial surface 100 of armature extension 102 from contacting a facing shoulder surface 104 of adjustment plug 48. Thus, the distance between armature surface 100 and shoulder surface 104 defines an axial "air gap" that varies through a range established upon movement of armature assembly 72 relative to adjustment plug 48. In a "de-energized" state, a minimum current level (i.e., 0 amps) is supplied to coil assembly 32 from the controller unit such that coil spring 56 is capable of forcibly displacing armature assembly 72 to the position shown in FIG. 1 for establishing a "maximum" axial air gap between surfaces 100 and 104. In a fully "energized" state, a maximum current level is supplied to coil assembly 32 for generating magnetic flux which exerts a maximum attractive force on armature 64 for moving armature assembly 72 toward adjustment plug 48 in opposition to the biasing of coil spring 56 to establish a "minimum" axial air between surfaces 100 and 104.

To effect translational movement of armature assembly 72, coil assembly 32 is energized in order to induce a magnetic field which travels through a flux circuit or path comprising flux collector 22, valve body extension 92, tubular body member 86, armature body 64, adjustment plug 48, housing 18 and then back to flux collector 22. As will be appreciated, each component associated with this flux circuit is made of a magnetic material. As is known, completion of the magnetic flux path results in a displacing or attractive force being exerted upon armature assembly 72 in a generally upward direction with respect to FIG. 1, in opposition to the biasing force normally exerted thereon by coil spring 56. During controlled energization of coil assembly 32, armature assembly 72 translates within bobbin central bore 82 and tubular body member central bore 84, with its longitudinal orientation and radial clearances maintained by guide bearing 78 supporting second end 76 of pin 68 and combined bearing/diaphragm seal 12 supporting first end 74 of pin 68. In addition, a non-magnetic spacer ring 106 surrounds pin 68 and is located between a terminal end surface 108 of armature 64 and combined bearing/diaphragm seal 12 for the purpose of inhibiting contact therebetween, thereby preventing "shorting" of the magnetic flux path.

In addition to the above, variable force solenoid valve assembly 10 includes a mechanism for exerting an adjustable compliant loading on armature assembly 72 which opposes the attractive force generated through energization of coil assembly 32. In particular, by adjustably changing the threaded position of spring adjustment screw 52 relative to adjustment plug 48, a variation in the biasing force exerted by coil spring 56 is established due to the change in pre-compression of coil spring 56. Adjustment plug 48, as noted, is made of magnetic material and provides means for variably adjusting the axial working air gap distance. More particularly, the axial air gap between radial surface 100 of armature 64 and radial surface 104 of adjustment plug 48 can be adjusted by varying the threaded position of adjustment plug 48 relative to closed end 20 of housing 18. As is known in the solenoid art, it is necessary to control the minimum air gap distance since the attraction force between the surfaces of an air gap for a given current flow increases in proportion to the inverse of the square of the air gap distance. When the separation distance become extremely small, a change in state of the solenoid valve assembly following de-energization becomes less reliable if any residual magnetism is present whenever no electrical current is flowing through the coil assembly. Moreover, direct contact or excessively small air gap distances are to be avoided since it can detrimentally affect the operating characteristic for the variable force solenoid valve assembly.

According to a unique feature of the present invention, combined bearing/diaphragm seal 12 is comprised of a relatively rigid, yet deflectably resilient spring plate 110 that is laminated between two layers 112 and 114 of a suitable elastomeric material. Combined bearing/diaphragm seal 12 is press-fit between the terminal end of end portion 88 of tubular body member 86 and a recessed shoulder surface 116 formed in annular extension 92 of valve body 94. In general, combined bearing/diaphragm seal 12 is a "dual" function device which acts as a low friction, or frictionless, guide bearing for guiding movement of first end 74 of pin 68 as it translates therethrough. In addition, combined bearing/diaphragm seal 12 further functions to provide a "barrier" between a fluid chamber 118 of valve sub-assembly 16 and chamber 120 of solenoid sub-assembly 14 for inhibiting fluid communication therebetween. In the anticipated environment, chamber 118 is filled with pressurized hydraulic fluid while chamber 120 is vented to atmospheric air.

Figure 2:
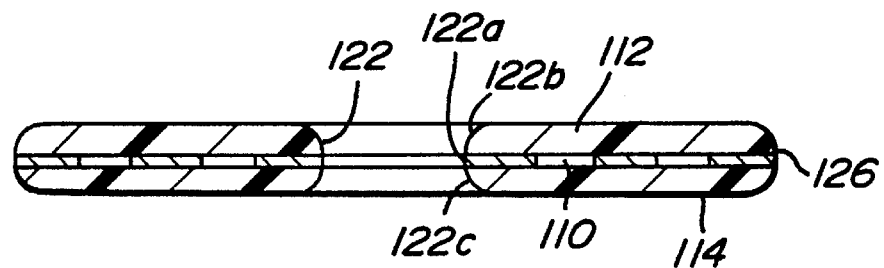
FIG. 2 is an enlarged cross-sectional view of the combined bearing/diaphragm seal of the present invention.
Figure 3:
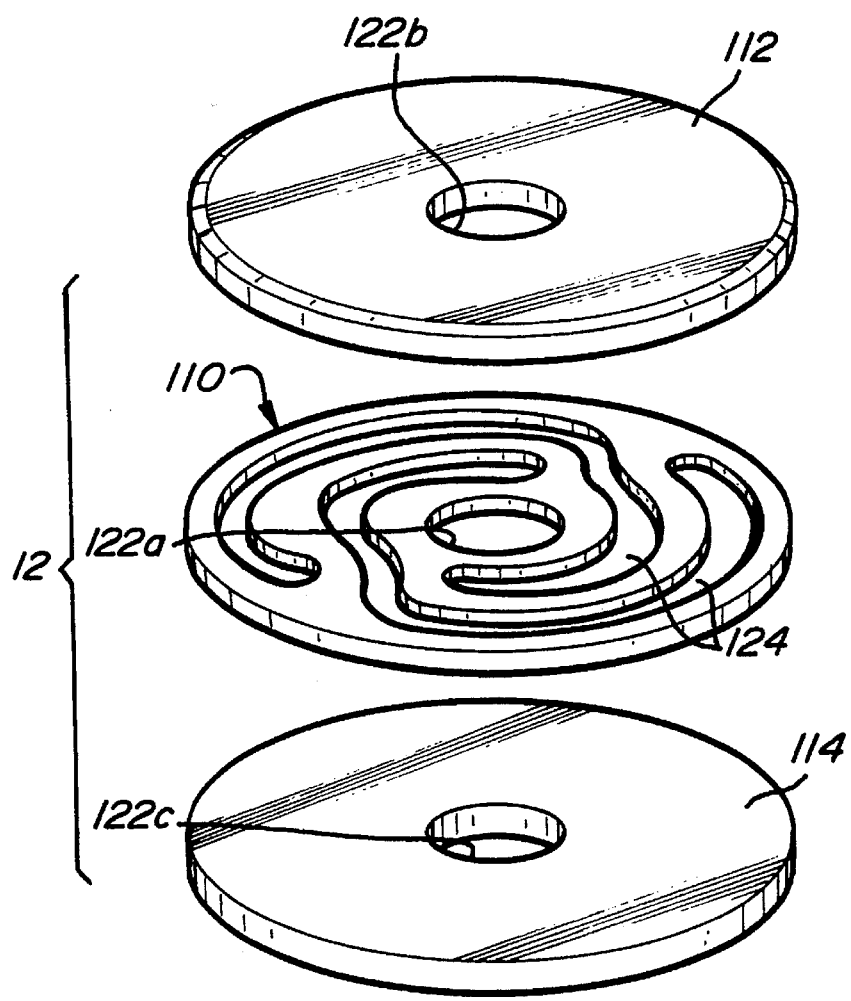
FIG. 3 is an exploded perspective view of the combined bearing/diaphragm seal.

Referring now to FIGS. 2 and 3, a preferred construction for combined bearing/diaphragm seal 12 is shown in greater detail. As noted, combined bearing/diaphragm seal 12 includes a thin disc-like spring plate 110 sandwiched between two layers 112 and 114 of an elastomeric material. In general, the elastomeric layers are adapted to insulate spring plate 110 from the magnetic components associated with the solenoid flux path. Combined bearing/diaphragm seal 12 includes a central bore 122 through which pin member 68 passes and provides a bearing support for enabling pin member 68 to translate axially. Due to the fact that the outer peripheral portion of combined bearing/diaphragm seal 12 is fixedly retained between tubular member 86 and valve body 94, axial movement of pin 68 results in resilient deflection of combined bearing/diaphragm seal 12 in a manner somewhat similar to a conventional diaphragm. However, the rigidity of spring plate 110 maintains the radial positioning of pin 68 along the common longitudinal axis. To this end, spring plate 110 is preferably a flat circular metallic disc having a central bore 122a and a series of spiral cutouts 124 which enable spring plate 110 to deflect in both axial directions in correspondence with movement of pin member 68. More particularly, cutouts 124 impart resilient flexibility in a direction perpendicular to the plane of flat spring plate 110 while maintaining rigidity in the general plane thereof. In addition, elastomeric layers 112 and 114 are preferably made from a low durometer material and are shown applied (i.e., glued) to both sides of spring plate 110. Alternatively, spring plate 110 may be coated (i.e., dipped, sprayed, etc.) with an elastomeric material. Elastomeric layers 112 and 114 enclose cutouts 124 and include bores 122b and 122c, respectively, which provide a fluid-tight seal relative to pin 68 during deflection of spring plate 110. Thus, elastomeric layers 112 and 114 provide a fluid seal across a number of potential fluid leakage paths, such as between cutouts 124, as well as around the outermost peripheral edge 126 of spring plate 110. As will be appreciated, spring plate 110 can be made of any suitable material (i.e., metallic or non-metallic) which provides the requisite rigidity and deflectable resiliency. Likewise, the elastomeric layers could also be made of any material providing the requisite insulative and fluid isolating characteristics.

In accordance with yet another feature of this invention, the "self-balancing" fluid control components associated with valve sub-assembly 16 of variable force solenoid valve assembly 10 are shown in FIG. 1. As noted, variable force solenoid valve assembly 10 is operable to control the fluid pressure discharged from valve sub-assembly 16 in response to the electrical current signal applied to coil assembly 32. Such control is achieved by selectively regulating the outlet pressure by restricting fluid flow and venting or "bleeding" fluid to a sump. In solenoid design, it is also desirable to stabilize the input pressure characteristics of the valving to inhibit decay or attenuation of the effect of input pressure variations with time. Attenuation of such effects is provided, according to the preferred embodiment of this invention, through the utilization of an inlet pressure compensator that is designed to be "self-balancing" so as to minimize sensitivity of the regulated output pressure to fluctuations in the inlet pressure.

The unique "self-balancing" valve sub-assembly 16 will now be described with reference to FIG. 1. Valve sub-assembly 16 is primarily comprised of valve body 94, an inlet compensator spool 130, a nozzle 132 and a plug 134. Inlet compensator spool 130 has a central axial passageway 136 and a pair of radial passageways 138 and 140 which communicate with inlet ports 142 and 144, respectively, of valve body 94. Inlet compensator spool 130 is positioned within a central bore 146 of valve body 94 so that it may translate therein. Plug 134 is press fit into an enlarged chamber 148 in valve body 94 and provides a fluid-tight lower stop for inlet compensator spool 130. A slip fit between inlet compensator spool 130 and central bore 146 provides a fluid seal therebetween to prevent direct fluid flow between inlet ports 142 and 144 and outlet ports 150 and 152 via central bore 146. Moreover, a plurality of small pressure rings 154 are circumferentially disposed around the outer diameter of inlet compensator spool 130 and provide a more uniform distribution of forces resulting from the slip fit of inlet compensator spool 130 and central bore 146 of valve body 94. Inlet compensator spool 130 is downwardly biased, with respect to FIG. 1, by a coil spring 156 seated between a spring seat 158 formed at an end of inlet compensator spool 130 and a radial surface 160 formed in enlarged central bore 162 of nozzle 132.

Inlet compensator spool 130 is adapted to compensate for fluctuations in the inlet pressure entering valve sub-assembly 16 at inlet ports 142 and 144 by varying the undercut or overlap between radial passages 138 and 140 and inlet ports 142 and 144, respectively. As seen, radial passages 138 and 140 provide fluid communication between inlet ports 142 and 144, respectively, and axial passage 136. Thus, fluid provided at inlet ports 142 and 144 flows through radial passages 138 and 140, respectively, and into axial passage 136. In addition, axial passage 136 communicates with output ports 150 and 152 via a flow restricting passage 164 and a fluid chamber 166 so that fluid from inlet ports 142 and 144 may ultimately be discharged at a desired output pressure through output ports 150 and 152.

According to the unique "self-balancing" feature of valve sub-assembly 16, inlet compensator spool 130 is operable to stabilize the inlet fluid pressure of the fluid supplied to inlet ports 142 and 144 and which flows through radial passageways 138 and 140, respectively, into axial passageway 136, and subsequently into fluid chamber 166 via flow restrictor passage 164. As the inlet fluid passes through fluid restrictor passage 164, a pressure gradient between passage 136 and fluid chamber 166 is established such that inlet spool compensator 130 experiences a lifting force in a direction opposing the biasing force exerted thereon by coil spring 156. As the inlet fluid pressure increases, the lifting force experienced by inlet compensator spool 130 also increases and eventually overcomes the downwardly biasing force of coil spring 156 for moving inlet compensator spool 130 upward with respect to FIG. 1, thereby causing the overlap between inlet ports 142 and 144 and radial passages 138 and 140, respectively, to decrease. Accordingly, the decreased overlap causes a corresponding reduction in the fluid flow into axial passage 136. The reduced fluid flow decreases the fluid pressure within passageway 136 which, in turn, decreases the lifting force exerted on inlet spool compensator 130. As such, the biasing force of coil spring 156 urges inlet spool compensator 130 to move in a downward direction, thereby increasing the overlap between inlet ports 142 and 144 and radial passages 138 and 140, respectively. This "self-balancing" system, as effected by inlet compensator spool 130 and coil spring 156, provides a balanced inlet fluid pressure, thereby effectively reducing variations in the outlet fluid pressure as a result of inlet pressure fluctuations.

With continued reference to FIG. 1, nozzle 132 is shown press-fit into an enlarged portion 170 of central bore 146 of valve body 94. Nozzle 132 includes a raised valve seat 172 and a nozzle chamber 174 which communicates with fluid chamber 166. In addition, a poppet 176 is connected to first end 74 of pin member 68 and is adapted to move with armature assembly 72 for controlling fluid flow through nozzle chamber 174 to exhaust chamber 118. Moreover, valve seat 172 is raised to maximize the pressure gradient between exhaust ports 178 and 180 and nozzle chamber 174 to effect a rapid outlet fluid pressure release. Poppet 176 further includes a raised annular flange 184 surrounding pin 68 which minimizes contact with the underside surface of combined bearing/diaphragm seal 12 for enabling greater flexibility thereof. When poppet 176 is seated on valve seat 172, outlet ports 150 and 152, fluid chamber 166, and nozzle chamber 174 are cut off from exhaust ports 178 and 180. Moreover, when poppet 176 is seated on valve seat 172, there is no bleed path through which fluid may be exhausted such that the outlet fluid pressure at outlet ports 150 and 152 is at a maximum. In order to controllably decrease the outlet pressure, poppet 176 is lifted off valve seat 172 in response to controlled upward movement of armature assembly 72 upon energization of coil assembly 32, thereby creating a fluid communication passageway between nozzle chamber 174 and exhaust chamber 118 so that the exhausted fluid may flow from exhaust ports 178 and 180 back to a low pressure fluid sump (not shown).

Controlled modulation of the outlet pressure through outlet ports 150 and 152 is provided by selectively energizing coil assembly 32. A given level of current through coil 36 causes an induced magnetic flux which, in turn, creates a magnetic attractive force for urging armature assembly 72 in an upward direction in opposition to the biasing force imposed by coil spring 56 and as aided by the feedback pressure acting on poppet 176 in nozzle chamber 174. This action has the effect of increasing the opening between valve seat 172 and poppet 176. Thus, the resultant force causes armature assembly 72 to move in an upward direction, increasing the size of the fluid passageway between nozzle chamber 174 and exhaust chamber 118, thereby reducing the outlet fluid pressure at outlet ports 150 and 152.

During initial assembly and calibration, fluid at a given inlet pressure is applied through inlet ports 142 and 144. With no electrical signal applied to coil assembly 32, spring adjustment screw 52 is adjusted to vary the force exerted by coil spring 56 so as to achieve a desired outlet pressure at output ports 150 and 152. Next, a known voltage signal is applied to coil assembly 32 to provide a predetermined current. Adjustment plug 48 is then threadably adjusted until a desired control pressure is provided at outlet ports 150 and 152 which occurs when a proper axial air gap distance exists between armature surface 100 and adjustment plug surface 104 is established. The current is then removed from solenoid valve assembly 10 and spring adjustment screw 52 is readjusted to re-obtain the original outlet control pressure.

While the above detailed description describes a preferred embodiment of the present invention, it will be understood that the present invention is susceptible to modification, variation and alteration without deviating from the scope and fair meaning of the subjoined claims.

What is claimed is:

1. A solenoid valve for use in a fluid circuit to control the pressure in the fluid circuit in response to an electrical signal, comprising:

a solenoid assembly having a movable armature adapted to axially translate within an electrical coil winding in response to said electrical signal being applied to said coil winding;

a valve assembly including a valve body coupled to said solenoid assembly and having an inlet and an outlet connected to said fluid circuit, and a valve member that is axially movable for controlling the pressure of fluid delivered from said inlet to said outlet;

coupling means for coupling said valve member to said armature for concurrent movement therewith; and a flexible bearing for guiding axial movement of said coupling means and inhibiting the flow of fluid from said valve assembly into said solenoid assembly, said flexible bearing having a disc-like spring plate fixed at its outer periphery between said valve body and said solenoid assembly and having a central bore surrounding said coupling means, and a fluid sealing material fixed to both sides of said disc-like spring plate for maintaining a fluid-tight seal with said coupling means during resilient flexure of said spring plate in response to movement of said coupling means.

2. The solenoid valve of claim 1 wherein said solenoid assembly further comprises a tubular member coaxially surrounding a portion of said armature such that said plate is retained between said tubular member and said valve body.

3. The solenoid valve of claim 1 wherein said fluid sealing material comprises a layer of elastomeric material secured to both sides of said spring plate that is engageable with said coupling means during deflection of said spring plate to provide a seal between said spring plate and said coupling means.

4. The solenoid valve of claim 3 wherein said coupling means is a pin member having a first portion fixed to said armature and a second portion fixed to said valve member, said flexible bearing being adapted to act on said pin member intermediate said first and second portions thereof.

5. In a fluid control device in which an inlet fluid pressure is controllably reduced to provide an outlet fluid pressure, said device including a valve assembly having a valve member that is movable for effecting pressure modulation of said inlet fluid pressure and an electromagnetic solenoid assembly having an armature that is movable in response to an electric current applied to a coil winding, said valve member and said armature being operatively connected for concurrent movement, an apparatus for providing fluid isolation between said valve member and said electromagnetic solenoid assembly of said fluid control device, said apparatus comprising:

a flexible spring plate supporting said armature for guiding translational movement thereof, said flexible spring plate adapted to resiliently deflect in response to such movement of said armature; and a fluid sealing material fixed to both sides of said flexible spring plate.

6. The apparatus as defined in claim 5 wherein said flexible spring plate is substantially flat and has cut-out portions enabling said plate to flex in a direction substantially perpendicularly to the direction of movement of said armature.

7. The apparatus as defined in claim 5 wherein said fluid sealing material is an elastomeric material.

8. A variable force solenoid valve assembly for controllably reducing a fluid inlet pressure to an outlet control pressure in response to an electrical input signal, comprising:

a solenoid sub-assembly having a housing, an electromagnetic coil located in said housing, and an armature assembly including an armature adapted to translate within said coil in response to said electrical input signal being applied to said coil;

a valve sub-assembly having a valve body mounted to said housing and including an inlet port, an outlet port, an exhaust port and a central bore axially aligned with said armature and adapted to fluidly communicate with each of said inlet outlet and exhaust ports, said valve sub-assembly further including valve means mechanically communicating with said movable armature and fluidly communicating said exhaust port with said outlet port, said valve means translating in accordance with translation of said armature for varying the fluid pressure discharged from said outlet port as a function of said electrical input signal; and a combined bearing/diaphragm seal through which a portion of said armature assembly extends, said combined bearing/diaphragm seal adapted to support said armature assembly for translational axial movement while concurrently providing fluid separation between said valve sub-assembly and said solenoid sub-assembly, said combined bearing/diaphragm seal including a generally flat spring plate having a bore enabling a portion of said armature assembly to translate in an axial direction therethrough and a fluid sealing material applied to both sides of said spring plate for providing fluid isolation between said bore and said portion of said armature assembly.

9. The apparatus as defined in claim 8 wherein said spring plate is adapted to resiliently flex in response to translational movement of said armature.

10. The apparatus as defined in claim 8 wherein said solenoid sub-assembly further comprises:

said energization coil defining a longitudinal bore with said armature disposed in said longitudinal bore and adapted to translate in response to energization of said coil;

magnetic means for defining a working air gap across which magnetic fields are transferred thereby generating an attracting force which urges said armature to move toward said magnetic means when said coil is energized; and spring means disposed between said magnetic means and said armature for urging said armature away from said magnetic means when said coil is de-energized.

11. The apparatus as defined in claim 10 wherein movement of said armature toward said magnetic means upon controlled energization of said coil produces corresponding movement of said valve means within said valve body central bore so as to increase the flow to said exhaust port and decrease the pressure of fluid discharged through said outlet port.

12. The apparatus as defined in claim 11 wherein said armature has a first end against which said spring means acts and a second generally closed end defining a central bore, said armature further including a pin having a first end permanently secured within said central bore and a second end coupled to said valve means, said combined bearing/diaphragm seal being located between said valve means and said second end of said armature.

13. A variable force solenoid valve assembly for controllably reducing a fluid inlet pressure to an outlet control pressure in response to an electrical input signal, comprising:

an energization coil assembly defining a central bore;

a moveable armature disposed in said central bore and adapted to translate therein in response to energization of said coil assembly;

a first flux collector magnetically coupled to said coil assembly, said first flux collector having adjustment means for varying the air gap between said armature assembly and said first flux collector across which magnetic fields are transferred for generating an attracting force between said first flux collector and said armature, said attracting force urging said armature to move toward said first flux collector when said coil assembly is energized;

spring means disposed between said first flux collector and said armature assembly for urging said armature away from said first flux collector when said coil assembly is de-energized;

a second flux collector disposed below and adjacent to said coil assembly;

a housing for enclosing said first flux collector, said coil assembly, and said second flux collector;

a valve body fixed to said second flux collector and having a central bore formed therein;

a valve member retained in said valve body central bore and coupled to said armature so as to permit movement of said valve member within said central bore of said valve body in response to movement of said armature;

a combined bearing/diaphragm seal through which a portion of said armature extends, said bearing/diaphragm seal adapted to axially guide said armature and concurrently provide fluid separation between said valve body and said solenoid assembly;

first passage means for communicating fluid at said inlet pressure to said outlet pressure;

second passage means for communicating fluid at said outlet pressure to an exhaust sump;

fluid restriction means for controllably restricting fluid flow between said first and second passages in accordance with the position of said valve member, said restriction means modulating said outlet pressure, whereby said outlet control pressure is controllably regulated in response to a resultant force imposed on said valve member due to said spring means, the controlled energization and de-energization of said coil assembly, and the fluid pressure acting on said valve member from within said valve body.

14. The variable force solenoid as defined in claim 13 wherein said combined bearing/diaphragm seal further comprises:

a disc-like spring plate having a bore enabling a portion of said armature to translate in an axial direction therethrough; and a fluid sealing material applied to said spring plate for providing fluid isolation between said solenoid assembly and said valve body.

15. The variable force solenoid as defined in claim 14 wherein said spring plate is adapted to flex in response to axial movement of said armature and said fluid sealing material is an elastomeric layer.

16. The variable force solenoid as defined in claim 15 wherein said adjustment means comprises a magnetic adjustment screw threaded into a central threaded bore provided in said first flux collector for varying the minimum air gap between said armature and said adjustment screw, said adjustment screw having a central threaded bore adapted to receive a spring adjustment plug for varying the compliant force of said spring means, and an annular stop ring disposed within said first flux collector bore adjacent said armature for inhibiting direct engagement of said armature with said adjustment screw.

17. The variable force solenoid as defined in claim 13 wherein said valve body further comprises:

a valve nozzle having a central bore oriented coaxially with said central bore of said valve body and defining at one end a valve seat to provide a flow restriction between said outlet pressure and said sump and at an opposite end a nozzle chamber in communication with said outlet fluid pressure;

an inlet compensator spool supported for translational movement within said central bore of said valve body and having a central fluid passageway and radial passageways providing fluid communication between said inlet pressure and said central passageway, said central passageway also communicating with said outlet fluid pressure;

second spring means seated against said valve nozzle for urging said inlet compensator spool in a first direction;

whereby, said inlet pressure is controllably balanced in accordance with said inlet pressure urging said inlet compensator spool in a second direction against the biasing exerted by said second spring means, thereby restricting inlet pressure to said radial passageways and reducing said inlet pressure, said reduction in inlet pressure causing said second spring means to urge said inlet compensator spool in said first direction.

* * * * *